United States Patent [19]

Johnson

[11] Patent Number: 5,017,624

[45] Date of Patent: May 21, 1991

[54] REDUCTION OF SILICONE FOAM DENSITY USING BUFFERS

[75] Inventor: Donald S. Johnson, Scotia, N.Y.

[73] Assignee: General Electric Company, Waterford, N.Y.

[21] Appl. No.: 597,253

[22] Filed: Oct. 15, 1990

Related U.S. Application Data

[62] Division of Ser. No. 570,236, Aug. 20, 1990.

[51] Int. Cl.$^5$ .............................................. C08J 9/00
[52] U.S. Cl. .................................... 521/154; 521/82; 521/88; 521/117
[58] Field of Search .................... 521/82, 88, 117, 154

[56] References Cited

U.S. PATENT DOCUMENTS

| | | | |
|---|---|---|---|
| 4,418,157 | 11/1983 | Modic | 521/154 |
| 4,851,452 | 7/1989 | Gross et al. | 521/154 |
| 4,879,317 | 11/1989 | Smith et al. | 521/154 |

*Primary Examiner*—Morton Foelak
*Attorney, Agent, or Firm*—M. A. Montebello

[57] ABSTRACT

A method is provided for preparing a silicone foam having reduced density of about 5 to about 6 pounds per cubic foot, comprising the step of agitating a mixture of ingredients comprising (A) a silicon composition, comprising by weight: (1) 100 parts of a vinyl-terminated polydiorganosiloxane (2) about 0.5 to about 5 parts by weight of an aqueous buffer solution having a pH in the range of about 9 to about 10; and (3) about 25 to about 140 parts per million of a platinum catalyst; (8) about 2.5 to about 20 parts of a substantially linear hydride polysiloxane (C) about 0.1 to about 15 parts of a cyclic hydride polysiloxane; and (D) about 0.1 to about 5 parts of a hydroxyl source selected from the group consisting of water, organic alcohol, or a mixture of the foregoing.

1 Claim, No Drawings

REDUCTION OF SILICONE FOAM DENSITY USING BUFFERS

This application is a division, of application Ser. No. 07/570,236, filed 08/20/90.

BACKGROUND OF THE INVENTION

The present invention relates to silicone foam compositions. More particularly, the present invention relates to a method for reducing the density of silicone foam compositions.

Elastomeric silicone foams are well known in the art. Reference may be made, for example, to U.S. Pat. Nos. 4,189,545; 3,923,705, 4,599,367 and 3,436,366. These foams have excellent physical properties and are useful in a variety of applications, for example, thermal and electrical insulation, flame barriers, and cushions.

However, elastomeric silicone foams have the drawback of being expensive. Thus, although these foams are superior to organic foams in many instances, organic foams are often used instead for economic reasons.

In an effort to overcome the cost disadvantages of silicone foams over organic foams, silicone foam manufacturers are constantly developing techniques for reducing the density of the silicone foam. Methods for reducing the density of silicone foam compositions are disclosed, for example, in U.S. Pat. Nos. 4,418,157, 4,851,452 and 4,879,317.

U.S. Pat. No. 4,879,317 to Smith et al. (Smith), discloses that a substantial reduction in silicone foam density can be achieved by using a hydride polysiloxane in a silicone foamable mixture comprising a vinyl-terminated polydiorganosiloxane, a hydride polysiloxane, a hydroxylated material, and an effective amount of a platinum catalyst, wherein the hydride polysiloxane in such silicone foamable mixture consists essentially of a mixture of a linear hydride polysiloxane and a cyclic hydride polysiloxane. A further reduction is achieved in the Smith foamable composition by using an aqueous mixture of a $C_{(1-8)}$ alkanol, such as a mixture of water and methanol. It is stated in Smith that densities of less than 20 pounds per cubic feet can be obtained by the method disclosed therein. Densities in the range of 7.5 to 14.1 are reported in the examples to have been obtained.

U.S. Pat. No. 4,418,157 to Modic discloses a method for reducing the density of a silicone foam by mixing a foamable composition containing a polydiorganosiloxane base polymer, an organohydrogen siloxane, and a platinum catalyst, with a resinous copolymer selected from the group consisting of copolymers comprising $R_3SiO_{0.5}$ units and $SiO_2$ units, and copolymers comprising $R_3SiO_{0.5}$ units, $R_2^1SiO$ units and $SiO_2$ units. Densities of 18.7 and 25.7 pounds per cubic foot were obtained in the examples in Modic.

U.S. Pat. No. 4,851,452 to Gross et al. discloses a method for reducing the density of silicone foam by using a platinum catalyst in the form of a mixture of a platinum vinyl siloxane complex and a platinum triaryl phosphine to generate hydrogen in a foamable composition vinyl-terminated polydiorganosiloxane, a hydride polysiloxane, and a hydroxylated material. Densities ranging from 11.2 to 17.5 were obtained in the examples.

It is desirable to provide a method for obtaining silicone foam having reduced density.

It is further desirable to provide a method for obtaining silicone foam having a density of about 5 to about 6.

SUMMARY OF THE INVENTION

Accordingly, it is an object of the present invention to provide a method for obtaining silicone foam having reduced density.

It is another object of the present invention to provide a method for obtaining silicone foam having a density of about 5 to about 6 pounds per cubic foot.

These objects are achieved in the present invention.

This invention is based on the discovery that the density obtained in a silicone foam can be reduced by controlling the pH of the foamable silicone composition used in preparing the foam.

The present invention provides a method for preparing a silicone foam having a reduced density of about 5 to about 6 pounds per cubic foot, comprising the step of agitating a mixture of ingredients comprising by weight:
(A) a silicone composition comprising by weight:
(1) 100 parts of a vinyl-terminated polydiorganosiloxane of the formula:

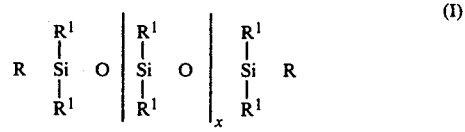
(I)

wherein R and $R^1$ are selected from the group consisting of substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;
(2) about 0.5 to about 5 parts of an aqueous buffer solution having a pH in the range of about 9 to about 10; and
(3) about 25 to about 140 parts per million of a platinum catalyst;
(B) about 2.5 to about 20 parts of a substantially linear hydride polysiloxane having the formula

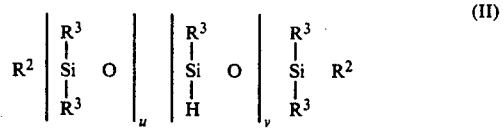
(II)

wherein $R^2$ is selected independently from the group consisting of hydrogen, alkyl radicals of from 1 to 8 carbon atoms, halo substituted alkyl radicals of from from 1 to 8 carbon atoms, aryl radicals of from 6 to 14 carbon atoms, and halo substituted aryl radicals of from about 6 to 14 carbon atoms; and $R^3$ is selected from the group consisting of alkyl radicals of from 1 to 8 carbon atoms, aryl radicals of from 6 to 14 carbon atoms, halo aryl radicals of from 6 to 14 carbon atoms, and haloalkyl radicals of from 3 to 8 carbon atoms; u and v are integers which can vary sufficiently to provide a hydride polysilox- ane having a viscosity of from about 5 to about 10,000 centipoise at 25° C.;
(C) about 0.1 to about 15 parts of a cyclic hydride polysiloxane having the general formula:

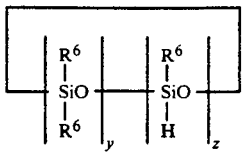

wherein $R^6$ may be independently hydrogen, an alkyl radical of from 1 to 8 carbon atoms, an aryl radical from 6 to 14 carbon atoms, or a haloalkyl radical of 3 to 8 carbon atoms; y is an integer having a value of 0 to 5 inclusive, z is an integer having a value of from 1 to 8 inclusive, and the sum of y and z has a value of 3 to 8 inclusive.

(D) about 0.1 to about 5 parts of a hydroxyl source selected from the group consisting of water, organic alcohol, or a mixture of the foregoing.

The present invention is further directed to a foamable silicone composition comprising ingredients (A)-(D) used in the method set forth above as well as to the silicone foams resulting from the cure of the foamable compositions.

DETAILED DESCRIPTION OF THE INVENTION

Part (1) of Component A contains 100 parts of a vinyl-terminated polydiorganosiloxane having formula (I) above.

In formula (I), R and $R^1$ may be substituted or unsubstituted hydrocarbon radicals of from 1 to 20 carbon atoms with the proviso that there is controlled vinyl substitution and controlled viscosity. The vinyl substitution should range from about 0.0002 to 3% by weight and preferably, from about 0.001 to about 1% by weight.

Viscosity should vary from about 100 to about 1,000,000 centipoise at 25° C. and preferably, from about 2500 to 500,000 centipoise. Although a polymer having a broader range of vinyl content will operate in the present invention, the more limited vinyl concentration given above will allow for a reaction that proceeds at an appropriate rate, that is not too slow and allows for proper cross-linking in the polymer to produce cured elastomeric silicone foam. With respect to the preferred range of viscosity, as can be appreciated, it is preferred that the viscosity not be too high, otherwise the composition is difficult to handle and will not foam well. The vinyl-containing polymer will form the major part of the foamable composition and thus the viscosity will be important to the viscosity of the final composition.

Substituted or unsubstituted hydrocarbon radicals of R and $R^1$ may be selected from alkyl radicals, methyl, ethyl, propyl, etc.; cycloalkyl radicals such as cyclohexyl, cycloheptyl, etc.; mononuclear aryl radicals such as phenyl, methyl phenyl, ethylphenyl, etc.; alkenyl radicals such as vinyl, allyl, etc. and more preferably vinyl and other well known substituent groups for diorganopolysiloxane polymers. Preferably the R and $R^1$ radicals are selected from the class consisting of alkyl radicals of 1 to 8 carbon atoms, aryl radicals such as phenyl; vinyl radicals and halogenated hydrocarbon atoms, such as, for instance 3,3,3-trifluoropropyl. Most phenyl radicals, vinyl radicals and and 3,3,3-trifluoropropyl radicals where the polymer has the foregoing vinyl substitution and R is vinyl. Although vinyl-containing polysiloxane where the vinyl units appear only on the siloxane chain can be used to produce silicone foam, the physical properties are not as good as where there is is terminal vinyl substitution. A particularly preferred polymer has only terminal vinyl substitution, i.e. where R is vinyl and $R^1$ is methyl, phenyl, and/or 3,3,3-trifluoropropyl.

Vinyl-containing polysiloxanes are well known in the art and may be produced by a variety of methods, for instance, by equilibrating cyclic polysiloxanes with or without vinyl substitution in the presence of appropriate amounts of vinyl substituted chainstopper. Further details for production of vinyl-substituted polysiloxanes may be found in U.S. Pat. No. 3,425,967 to Modic. Further suitable vinyl-containing polysiloxanes may be found in U.S. Pat. Nos. 4,599,367; 4,418,157 and 3,923,705, all of which are incorporated herein by reference.

Part (2) of Component A contains about 1 to about 5 parts of a buffer solution having a pH in the range of about 9 to about 10, and preferably about 10. The buffer solution is preferably present in the foamable composition in an amount ranging from about 0.5 to about 5, and most preferably about 2 to about 4, parts by weight.

It is to be understood by those skilled in the art that the concentration of buffer in the buffer solution should not be excessive because too high a buffer concentration may result in extremely rapid hydrogen gas evolution but no cure, eventually leading to the collapse of the rising foam under its own weight. What constitutes excessive buffer concentration for a particular buffer solution can be determined by simple experimentation by those skilled in the art.

The aqueous buffer solutions useful in the present invention include any of the standard aqueous buffer solutions known in the art for providing pH values in the range of about 9 to about 10. Suitable buffer solutions are disclosed in the CRC Handbook of Chemistry and Physics, 70th Edition, at page D-145, which is incorporated by reference herein.

For example, a buffer solution containing 50 milliliters of 0.025 molar borax and 4.6 milliliters of 0.1 molar HCl can be used to provide a pH of 9. A buffer solution containing 50 milliliters of 0.05 molar sodium bicarbonate and 10.7 milliliters of 0.1 molar NaOH will provide a pH of 10.

Part (3) of component A contains about 25 to about 140 parts per million of a platinum catalyst. Suitable platinum catalysts include, for example, reaction products of an olefin and chloroplatinic acid as described in Ashby, U.S. Pat. No. 3,159,601, or the reaction product of platinic chloride and cyclopropane as described in Ashby, U.S. Pat. No. 3,159,662. Further platinum complexes which can be used as the platinum catalyst are reaction products of chloroplatinic acid with up to 2 moles, per gram of platinum of a member selected from the class consisting of alcohols, ethers, aldehydes, and mixtures thereof, as shown in Lamoreaux, U.S. Pat. No. 3,220,972. The preferred platinum catalyst is shown by Karstedt, U.S. Pat. No. 3,775,452, which is formed by reacting chloroplatinic acid with tetramethyldivinyl-disiloxane in the presence of sodium bicarbonate in an ethanol solution. It has been found that effective results can be achieved if sufficient platinum catalyst is used in the silicone foamable composition to provide from 1 to 250 parts per million of platinum, preferably from 1 to 200 parts of platinum per million parts of mixture.

In preferred embodiments of the present invention, component A comprises about 10 to about 100 parts by weight of a resinous copolymer selected from the group consisting of copolymers comprising $R_3^7SiO_{0.5}$ units and $SiO_2$ units, the ratio of $R_3^7SiO_{0.5}$ units to $SiO_2$ units ranging from about 0.25 to about 0.8:1, and copolymers comprising $R_3^7SiO_{0.5}$ units, $R_2^8$ SiO units and $SiO_2$ units, where the ratio of monofunctional units to tetrafunctional units is from about 0.25 to about 0.8:1 and the ratio of difunctional units to tetrafunctional units is from 0 to about 0.1:1, where $R^7$ and $R^8$ are selected from the group consisting of alkyl radicals, aryl radicals, aralkyl radicals, cycloalkyl radicals, vinyl radicals, allyl radicals and fluoroalkyl radicals. The presence of this resinous copolymer acts to lower the density and increase the strength of the foam. This copolymer is known in the art, for example, as described in U.S. Pat. No. 4,418,157 to Modic, which is incorporated by reference herein. Preferably, in the formulas provided above for the copolymer, the alkyl radicals have from 1 to 8 carbon atoms, the aralkyl from 7 to 13 carbon atoms, the cycloalkyl radicals from 6 to 8 carbon atoms and preferably the fluoroalkyl radical is 3,3,3-trifluoropropyl.

Preferably, Component A also contains from 1 to 200 parts by weight of a filler per hundred parts of foam composition. It is preferred to use extending fillers or reinforcing fillers such as fumed silica. Precipitated silica also can be used in instances where it is desired to increase the physical properties such as the tensile strength and tear strength of the resulting elastomeric foam. Other extending fillers which may be utilized are, for example, titanium dioxide, lithopone, zinc oxide, zirconium silicate, silica airogel, iron oxide, diatomaceous earth, calcium carbonate, glass fibers, magnesium oxide, chromic oxide, zirconium oxide, aluminum oxide, alpha-quartz, clay, carbon and graphite. In order to minimize the viscosity increase generally experienced when using reinforcing fillers, the reinforcing fillers can be heat treated with cyclic polysiloxanes or silazanes. A preferred filler in the practice of this invention is ground quartz which has been found to enhance the burn-resistant properties of the composition as well as imparting some enhanced physical properties to the final cured silicone foam.

Component B is a linear hydride polysiloxane having the general formula (II) above. Preferably, the hydride polysiloxane consists essentially of chemically bonded organosiloxy units having silicon bonded hydrogen atoms attached to silicon to form the polysiloxane chain backbone.

The composition of this invention preferably further contains about 0.1 to about 15 parts of a cyclic hydride polysiloxane having the general formula (III) above. Preferably, the cyclic hydride polysiloxane is a hydride cyclotetrasiloxane.

In formulas (II) and (III), $R^2$ may be independently hydrogen, an alkyl radical of from 1 to 8 carbon atoms, an aryl radical from 1 to 8 carbon atoms or a haloalkyl radical of from 3 to 8 carbon atoms.

It is preferred that the hydride polysiloxanes have a hydrogen content ranging from about 0.3 to about 1.6% by weight and as shown in formula (II), u and v vary to provide a viscosity ranging from 1 to 500 centipoise at 25° C. The hydride content is not critical but such a content substantially less than about 0.3% by weight of the hydride polysiloxanes may not provide sufficient hydrogen in the foamable composition to react with the hydroxy source and liberate hydrogen gas as well as react and cross-link with vinyl molecules of the vinyl-containing polysiloxane. The result will of course be a poorly blown and undercured foam. Likewise, viscosity of the hydride polysiloxane is not critical, but higher viscosity materials may be difficult to obtain and utilize. Preferably, viscosity ranghes from about 5 to about 250 centipoise at 25° C., and most preferably from about 5 to 100 centipoise.

Component D provides a hydroxyl source. A hydroxyl source is necessary to properly blow the foamable composition. The source of hydroxyl may be water or organic alcohol or a mixture of water and organic alcohol. Suitable hydroxylated materials include organic alcohols which are monohydric or polyhydric alchols having from about 1-12 carbon atoms. Preferably, there can be used methanol, ethanol, propanol, butanol, lauryl alcohol, octyl alcohol, and ethylene glycol. The most preferred alcohol is methanol.

Other aspects of the present invention provide a foamable composition comprising components A-D above and the silicone foam produced from the cure thereof.

The silicone foamable compositions of the present invention are generally used and stored as a four-part composition, with components A, B, C, and D forming the four parts.

In forming the silicone foam, components B, C, and D are agitated, preferably rapidly, with component A. The resulting composition can be poured into a cavity and allowed to stand. The composition thereafter will begin to cross-link and generate gas simultaneously resulting in a cured elastomeric silicone foam having a density of about 5 to about 6 pounds per cubic foot.

In order that those skilled in the art will be better able to practice the present invention, the following examples are given by way of illustration and not by way of limitation. All parts are by weight.

EXAMPLES 1-7 AND CONTROL EXAMPLE A

A mixture of 200 grams of a blend (Part A) was prepared containing 39% by weight of a polydimethylsiloxane having terminal dimethylvinylsiloxy units and a viscosity of about 75,000 centistokes; 15% by weight of a polydimethylsiloxane having terminal dimethylvinylsiloxy units and a viscosity of 4000 centistokes, 18% by weight of a methylsiloxane resin consisting essentially of chemically combined $SiO_2$ in a ratio of 1.43 moles of trimethylsiloxy units, per 0.25 mole of methylvinylsiloxy units, 1.5% by weight of buffered water, and 20 to 45 parts per million of platinum in the form of a platinum vinyl siloxane complex. Example 7 further contained 25% by weight of alpha-quartz.

There was then added to Part A, 20.0 grams of a linear hydride polysiloxane having terminal trimethylsiloxy units and consisting essentially of methyl hydrogen siloxy units having a viscosity of about 15–40 centistokes (Part B), and 7.58 grams of a cyclic methylhydrogen tetrasiloxane (Part C), and 3.02 grams of methanol (Part D).

Because it has reduced polymer content as a result of filler loading as compared to Part A in Examples 1-6, Part A in Example 7 was converted to silicone foam by reacting it with 5.68 grams of a cyclic methylhydrogen tetrasiloxane, 15.0 grams of a linear hydride polysiloxane having terminal trimethylsiloxy units and consisting essentially of methylhydrogen siloxy units having a viscosity of about 15–40 centistokes, and 2.26 grams of methanol.

The hydride polysiloxane mixture was mixed with the platinum containing silicone mixture for 30 seconds and then transferred to a pre-weighed container. Foaming occurred in the resulting mixed blend.

The buffering solutions used in the respective examples are indicated in Table 1 below.

TABLE 1

| Example No. | Description | pH of buffer solution |
|---|---|---|
| 1 | potassium hydrogen phthalate | 5 |
| 2 | potassium phosphate mono basic/ sodium hydroxide | 6 |
| 3 | potassium phosphate mono basic/ sodium hydroxide | 7 |
| 4 | potassium phosphate mono basic/ sodium hydroxide | 8 |
| 5 | borax | 9 |
| 6 | sodium bicarbonate/ sodium carbonate | 10 |
| 7 | sodium bicarbonate/ sodium carbonate plus 335 g of 10M minusil | 10 |
| A | deionized water - not buffered | — |

The density of the foams prepared in Examples 1–7 and Control Example A were measured and are presented in Table 2 below.

TABLE 2

| Example No. | pH of Buffer Solution | Density (lbs/ft 3) |
|---|---|---|
| 1 | 5 | 7.2 |
| 2 | 6 | 6.7 |
| 3 | 7 | 7.0 |
| 4 | 8 | 5.6 |
| 5 | 9 | 6.0 |
| 6 | 10 | 4.8 |
| 7 | 10 | 4.8 |
| A | — | 9.2 |

The data shown in Table 2 indicates that a silicone foam having a density of about 5 to about 6 can be obtained at pH levels of about 9 to about 10. The data further shows that the presence of a filler does not affect the buffer solution's effects on the density.

What is claimed is:

1. A silicone foam having a reduced density of about 5 to about 6 pounds per cubic foot, comprising the cured product of a foamable composition comprising by weight:

(A) a silicone composition, comprising by weight:
   (1) 100 parts of a vinyl-terminated polydiorganosiloxane of the formula:

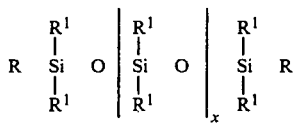

wherein R and $R^1$ are selected from the group consisting of substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;

(2) about 0.5 to about 5 parts by weight of an aqueous buffer solution having a pH in the range of about 9 to about 10; and
   (3) about 25 to about 140 parts per million of a platinum catalyst;

(B) about 2.5 to about 20 parts of a substantially linear hydride polysiloxane having the formula

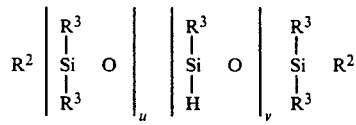

wherein $R^2$ is selected independently from the group consisting of hydrogen, alkyl radicals of from 1 to 8 carbon atoms, halo substituted alkyl radicals of from 1 to 8 carbon atoms, aryl radicals of from 6 to 14 carbon atoms, and halo substituted aryl radicals of from 6 to 14 carbon atoms; and $R^3$ is selected from the group consisting of alkyl radicals of from 1 to 8 carbon atoms, aryl radicals of from 6 to 14 carbon atoms, halo aryl radicals of from 6 to 14 carbon atoms, and haloalkyl radicals of from 3 to 8 carbon atoms; u and v are integers which can vary sufficiently to provide a hydride polysiloxane having a viscosity of from about 5 to about 10,000 centipoise at 25° C.;

(C) about 0.1 to about 15 parts of a cyclic hydride polysiloxane having the general formula:

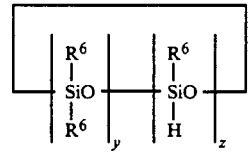

wherein $R^6$ may be independently hydrogen, an alkyl radical of from 1 to 8 carbon atoms, an aryl radical from 6 to 14 carbon atoms, or a haloalkyl radical of 3 to 8 carbon atoms; y is an integer having a value of 0 to 5 inclusive, z is an integer having a value of from 1 to 8 inclusive, and the sum of y and z has a value of 3 to 8 inclusive; and (D) about 0.1 to about 5 parts of a hydroxyl source selected from the group consisting of water, organic alcohol, or a mixture of the foregoing.

* * * * *

UNITED STATES PATENT AND TRADEMARK OFFICE
CERTIFICATE OF CORRECTION

PATENT NO. : 5,017,624
DATED : May 21, 1991
INVENTOR(S) : Donald S. Johnson

It is certified that error appears in the above-identified patent and that said Letters Patent is hereby corrected as shown below:

column 3, lines 64-67, please delete the sentence "Most phenyl radicals, vinyl radicals and and 3,3,3-trifluoropropyl radicals where the polymer has the foregoing vinyl substitution and R is vinyl."

Signed and Sealed this

Fifteenth Day of December, 1992

Attest:

DOUGLAS B. COMER

Attesting Officer

Acting Commissioner of Patents and Trademarks